US011714972B2

(12) United States Patent
Srinivasan et al.

(10) Patent No.: US 11,714,972 B2
(45) Date of Patent: *Aug. 1, 2023

(54) SYSTEMS AND METHODS FOR TRANSFERRING STYLISTIC EXPRESSION IN MACHINE TRANSLATION OF SEQUENCE DATA

(71) Applicant: ADOBE INC., San Jose, CA (US)

(72) Inventors: Balaji Vasan Srinivasan, Bangalore (IN); Anandhavelu Natarajan, Bengaluru (IN); Abhilasha Sancheti, Bengaluru (IN)

(73) Assignee: Adobe Inc., San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/529,886

(22) Filed: Nov. 18, 2021

(65) Prior Publication Data

US 2022/0075965 A1 Mar. 10, 2022

Related U.S. Application Data

(63) Continuation of application No. 16/407,704, filed on May 9, 2019, now Pat. No. 11,210,477.

(51) Int. Cl.
*G06N 3/08* (2023.01)
*G06N 3/02* (2006.01)
*G06F 40/58* (2020.01)
*G06F 40/44* (2020.01)
*G06F 40/47* (2020.01)

(52) U.S. Cl.
CPC .............. *G06F 40/58* (2020.01); *G06F 40/44* (2020.01); *G06F 40/47* (2020.01)

(58) Field of Classification Search
None
See application file for complete search history.

(56) References Cited

U.S. PATENT DOCUMENTS

| 9,858,263 | B2* | 1/2018 | Xiao | G06N 3/08 |
| 10,474,709 | B2* | 11/2019 | Paulus | G06F 40/284 |
| 2013/0311412 | A1* | 11/2013 | Lazar | H03M 3/502 |
| | | | | 706/16 |

(Continued)

OTHER PUBLICATIONS

Cho, Kyunghyun, et al. "Learning phrase representations using RNN encoder-decoder for statistical machine translation." arXiv preprint arXiv:1406.1078 (2014). (Year: 2014).*

(Continued)

*Primary Examiner* — Seong-Ah A Shin
(74) *Attorney, Agent, or Firm* — Shook, Hardy & Bacon L.L.P.

(57) ABSTRACT

Embodiments of the present disclosure are directed to a system, methods, and computer-readable media for facilitating stylistic expression transfers in machine translation of source sequence data. Using integrated loss functions for style transfer along with content preservation and/or cross entropy, source sequence data is processed by an autoencoder trained to reduce loss values across the loss functions at each time step encoded for the source sequence data. The target sequence data generated by the autoencoder therefore exhibits reduced loss values for the integrated loss functions at each time step, thereby improving content preservation and providing for stylistic expression transfer.

16 Claims, 6 Drawing Sheets

(56) References Cited

U.S. PATENT DOCUMENTS

| | | | | |
|---|---|---|---|---|
| 2015/0356401 | A1* | 12/2015 | Vinyals | G06N 3/045 |
| | | | | 706/15 |
| 2016/0232440 | A1* | 8/2016 | Gregor | G06N 3/04 |
| 2018/0203852 | A1* | 7/2018 | Goyal | G06F 40/56 |
| 2018/0211265 | A1 | 7/2018 | Natarajan et al. | |
| 2018/0300400 | A1* | 10/2018 | Paulus | G06N 3/044 |
| 2018/0329883 | A1* | 11/2018 | Leidner | G06F 40/30 |
| 2018/0336884 | A1* | 11/2018 | Sriram | G06N 3/088 |
| 2018/0349303 | A1* | 12/2018 | Hamada | G06N 3/044 |
| 2019/0251952 | A1* | 8/2019 | Arik | G10L 13/027 |
| 2019/0385597 | A1* | 12/2019 | Katsamanis | G06Q 30/01 |
| 2020/0132491 | A1* | 4/2020 | Zhang | G06F 16/9537 |
| 2020/0219486 | A1* | 7/2020 | Fu | G06F 3/167 |
| 2020/0311341 | A1* | 10/2020 | Chaturvedi | G06N 3/04 |
| 2020/0320116 | A1* | 10/2020 | Wu | G06F 16/438 |
| 2020/0364303 | A1* | 11/2020 | Liu | G10L 15/16 |
| 2021/0020161 | A1* | 1/2021 | Gao | G10L 13/08 |

OTHER PUBLICATIONS

Paulus, Romain, Caiming Xiong, and Richard Socher. "A deep reinforced model for abstractive summarization." arXiv preprint arXiv:1705.04304 (2017). (Year: 2017).*

Al Nahas, A., Tunali, M. S., & Akgul, Y. S. (Apr. 2019). Supervised text style transfer using neural machine translation: converting between old and modern Turkish as an example. In 2019 27th Signal Processing and Communications Applications Conference (SIU) (pp. 1-4). IEEE. (Year: 2019).*

Yang, Zichao, et al. "Unsupervised text style transfer using language models as discriminators." Advances in Neural Information Processing Systems 31 (2018). (Year: 2018).*

Aaker, J. L., "Dimensions of Brand Personality", Journal of marketing research. vol. XXXIV, pp. 347-356 (Aug. 1997).

Fu, Z., et al., "Style Transfer in Text: Exploration and Evaluation", arXiv: 1711.06861v2, pp. 1-9 (Nov. 27, 2017).

Holtzman, A., et al., "Learning to Write with Cooperative Discriminators", arXiv: 1805.06087v1, pp. 1-17 (May 16, 2018).

Jhamtani, H., et al., "Shakespearizing Modern Language Using Copy-Enriched Sequence-to-Sequence Models", arXiv:1707.01161v2, pp. 1-10 (Jul. 20, 2017).

Keneshloo, Y., et al., "Deep Reinforcement Learning for Sequence-to-Sequence Models", arXiv: 1805.09461v4, pp. 1-22 (Apr. 15, 2019).

Li, J., et al., "Delete, Retrieve, Generate: A Simple Approach to Sentiment and Style Transfer", arXiv: 1804.06437v1, pp. 1-12 (Apr. 17, 2018).

Liang, J. H., et al., "Brand personality of two beverages categories", 20th Annual World Business Congress of the International Management Development Association, pp. 1-10 (2011).

Melnyk, I., et al., "Improved Neural Text Attribute Transfer with Non-parallel Data", Workshop on Learning Disentangled Representations: from Perception to Control (NIPS), pp. 1-6 (Dec. 4, 2017).

Papineni, K., et al., "BLEU: a Method for Automatic Evaluation of Machine Translation", Proceedings of the 40th Annual Meeting of the Association for Computational Linguistics (ACL), pp. 1-8 (Jul. 2002).

Paulus, R., et al., "A deep reinforced model for abstractive summarization", arXiv: 1705.04304v3, pp. 1-12, (Nov. 13, 2017).

Prabhumoye, S., et al., "Style Transfer Through Back-Translation", arXiv: 1804.09000v3, pp. 1-13 (May 24, 2018).

Rao, S., and Tetreault, J., "Dear Sir or Madam, May I Introduce the GYAFC Dataset: Corpus, Benchmarks and Metrics for Formality Style Transfer", Proceedings of the Conference of the North American Chapter of the Association for Computational Linguistics: Human Language Technologies (NAACL-HLT), vol. 1 (Long Papers), pp. 129-140 (Jun. 1-6, 2018).

Shen, T., et al., "Style Transfer from Non-Parallel Text by Cross-Alignment", 31st Conference on Neural Information Processing Systems (NIPS), pp. 1-12 (2017).

Wu, L., et al., "A Study of Reinforcement Learning for Neural Machine Translation", arXiv: 1808.08866v1, pp. 1-10 (Aug. 27, 2018).

Xu, W., et al., "Paraphrasing for Style", Proceedings of COLING: Technical Papers, pp. 2899-2914, (Dec. 2012).

Zhang, Z., and Sabuncu, M. R., "Generalized Cross Entropy Loss for Training Deep Neural Networks with Noisy Labels", 32nd Conference on Neural Information Processing Systems (NeurIPS), pp. 1-14 (Nov. 29, 2018).

Zhou, C., et al., "Exploring Contextual Word-level Style Relevance for Unsupervised Style Transfer", arXiv:2005.02049v1, pp. 1-10 (May 5, 2020).

* cited by examiner

SYSTEMS AND METHODS FOR TRANSFERRING STYLISTIC EXPRESSION IN MACHINE TRANSLATION OF SEQUENCE DATA

CROSS REFERENCE TO RELATED APPLICATIONS

The present application is a continuation of U.S. application Ser. No. 16/407,704, filed on May 9, 2019 and entitled "Systems and Methods for Transferring Stylistic Expression In Machine Translation of Sequence Data, the entirety of which is incorporated by reference herein.

BACKGROUND

Generally, machine translation refers to a hardware, software, or a combination thereof that is configured to perform the specific task of translating text or speech from one language to another language. For example, machine translation operates to substitute one or more words of text or speech in one language with one or more words from a secondary language, in attempting to translate the text or speech into the secondary language. An encoder-decoder model is a mapping model that may be used to accomplish the machine translation. In machine translation, the encoder-decoder model first uses an encoder to encode the source sequence data (e.g., a sentence in one language) into a representation and then uses a decoder to decode the representation into target sequence dates (e.g., the sentence as translated into another language). However, performance of machine translation via the encoder-decoder model is limited. For example, current machine translation may not maintain the meaning of the text or speech itself after translation because a word-for-word substitution often does not account for context, phrases, idioms, and differences in the linguistic structure of a sentence.

Current machine learning technologies may define or train an encoder-decoder model to identify and predict specific patterns when performing translation of text or speech using complex computer programming and algorithms. However, current machine learning technologies do not define or train an encoder-decoder model to account for stylistic expressions when performing translation of text or speech. Accordingly, the inability to account for stylistic expression during machine translation is just one of the technological shortcomings or technological problems found in current machine learning technologies.

SUMMARY

Embodiments of the present invention relate to techniques for stylistic expression transfer of sequence data. In brief and at a high level, various embodiments of the present invention provide a system, methods, and computer-readable media for facilitating stylistic expression transfers between different style corpora in machine translation of source sequence data via an autoencoder. Using embodiments herein, source sequence data may be transferred from one expression style (e.g., corresponding to a high excitement tone) to another different expression style (e.g., corresponding to a non-exciting tone) via machine translation by an autoencoder, while the content of the source sequence data is preserved in the target sequence data that is output. In another example, source sequence data may be transferred from one expression style level (e.g., a corresponding high excitement level) to another different expression style level (e.g., a corresponding moderate excitement level) via machine translation by the autoencoder. The style transfer is achieved using integrated loss functions for style transfer, content preservation, and/or cross entropy. The autoencoder uses these loss functions when processing the source sequence data, wherein the autoencoder is machine trained to reduce those loss values across each of the integrated loss functions, at each time step encoded for the source sequence data. Using the integrated loss functions to reduce loss during machine translation, the autoencoder generates target sequence data that exhibits reduced loss values for the integrated loss functions at each time step, thereby providing for stylistic expression transfer, while maintaining content preservation. Through the embodiments herein, source content of any style and/or of inconsistent styles can be transferred to another stylistic expression in order to ensure that all target sequence data is consistent with a desired style or stylistic expression level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description and Drawings.

BRIEF DESCRIPTION OF THE DRAWINGS

Embodiments are described in detail below with reference to the attached drawing figures, wherein.

DETAILED DESCRIPTION OF THE INVENTION

Figure 1:
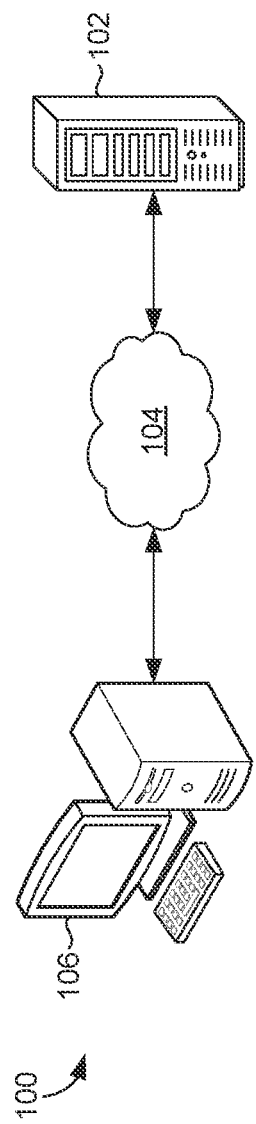
FIG. 1 illustrates an example operating environment for implementing embodiments in accordance with the present invention.

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step," "instance," and/or "block" may be used herein to connote different elements of methods employed, the terms should not be interpreted as implying any particular order among or between various steps herein disclosed unless and except when the order of individual steps is explicitly described. The present disclosure will now be described more fully herein with reference to the accompanying drawings, which may not be drawn to scale and which are not to be construed as limiting. Indeed, the present invention may be embodied in many different forms and should not be construed as limited to the embodiments set forth herein.

Definitions

Various terms and phrases are used herein to describe embodiments of the present invention. Some of the terms and phrases used herein are described here, but more details are included throughout the description.

As used herein, "machine translation" refers to fully automated software that can translate source content with one expression into target content with another expression.

As used herein, "style transfer framework" refers to an encoder-decoder model within a neural network that is specifically configured to perform machine translation.

As used herein, "encoder-decoder model" refers to a sequence to sequence (i.e., "seq2seq") model in the context of machine translation. Examples of encoder-decoder models include an autoencoder, a neural network, and a recurrent neural network.

As used herein, "electronic sequence data" refers to data that encodes content such as text or speech, and further encodes sequential information for that content.

As used herein, "source sequence data" refers to input data that encodes a sentence of text or speech in any language and/or stylistic expression, and of any variable length of words or characters.

As used herein, "target sequence data" refers to output data from an encoder-decoder model, the output data encoding a sentence of text or speech in any language and/or stylistic expression, and of any variable length of words or characters. The target sequence data encodes a sentence that has been translated from the source sequence data encoding the sentence in one language into another language by the encoder-model, in an embodiment. Additionally or alternatively, the target sequence data encodes a sentence that has been translated from the source sequence data encoding the sentence in one stylistic expression into another stylistic expression by the encoder-model. The target sequence data may have a different number of words or characters than the source sequence data, in embodiments. In another embodiment, the target sequence data may have the same number of word or characters as the source sequence data.

As used herein, "style" and "stylistic expression" are used interchangeably to refer to one or more dominant trait(s) that describe the language usage of a corpora, a sentence, a word, or the like. Examples of styles include excitement, formal, sincere, inspirational, trendy, sarcasm, humor, and juvenile. As such, styles may be associated with hyperbole, a lack of hyperbole, adjectives, a lack of adjectives, sentence structure, and/or specific punctuation marks, such as a period (.) or exclamation point (!). In embodiments, the style is used to describe the language usage within a sentence, for example, where the traits of the language usage create a particular "feel" for the sentence and may further provide emotional context for the meaning of the sentence.

As used herein, "style level" refers to a rating or a strength by which text or speech exhibits the one or more dominant trait(s) of a particular style. As such, one or more style levels within a particular style may be used in the stylistic transfer discussed herein to produce target sequence data having a specific degree of, for example, an excitement style. Style levels may be pre-defined by the structured language within a corpora for a particular style, in embodiments.

As used herein, "corpora" refers to one or more corpus used for language translation. A "corpus" refers to a body of a plurality of structured text or speech. The term "parallel corpora" refers to two or more corpora that have texts in two different languages or stylistic expressions that can be linguistically mapped to one another for the purpose of translation. The term "non-parallel corpora" refers to two or more corpora that have texts in two or more different languages or stylistic expressions which do not map to one another, or otherwise which are difficult to map to one another based on linguistic differences.

As used here, an "entity" refers to an individual having a personality profile and/or associated style. Examples of an entity include an individual person, a retailer, a wholesaler, a non-business entity, a social media entity, a blogger, a website, a brick-and-mortar entity, a franchise, an internet-based entity, or the like.

As used herein, "personality" and "personality profile" are used interchangeably to refer to one or more styles that, either alone or together, produce a unique and recognizable identity that correspond to a particular entity, based on the consistent association of the one or more styles with content, communications, and presence of that particular entity. For example, the language used for content provided by or on behalf of entity A in internet, application, and/or social media communications and presentation may be distinct from other entities, and/or may be related to the business subject matter of entity A. In this way, the style or stylistic expression of the language used for the content, communications, and presence of that particular entity is distinct to the entity. In an example, the personality profile of entity A may be recognizable by a user, a computing device, and/or artificial intelligence, such that entity A is distinguishable from the personality profile of entity B, when entity A and entity B are not the same entity, albeit entity A or entity B might be a sub-entity of the other. In another example, electronic or internet-based trade dress of an entity may comprise the one or more styles of the personality profile.

As used herein, "embedding space" refers to a low-dimensional space or layer into which high-dimensional vectors may be translated, in the context of machine translation. In embodiments, source sequence data is embedded into the embedding space using time steps to represent words in the sentence encoded by the source sequence data. As such, by mapping the source sequence data to the embedding space, the source sequence data may be represented as a plurality of time steps having a specific sequential order relative to one another, generally.

As used herein, "time step" corresponds to a word identified in the sentence encoded in the source sequence data. In an embodiment, a recurrent neural network obtains two inputs at each time step, those inputs being an input from source sequence data and a hidden state.

As used herein, "hidden state" refers to the sequential information that is preserved for the time steps preceding the current time step at a hidden layer. For example, a hidden state for time step $t_2$ includes the sequential information of prior time steps $t_1$ and $t_0$. In this way, a recurrent neural network using an encoder-decoder model is able to utilize the hidden state to "learn" from all of the prior time steps when the last sequential hidden state is passed from an encoder to a decoder, for example. In one embodiment, only the last hidden state corresponding to the last time step may be passed from the encoder to a decoder. In another embodiment, all of the hidden states of all of the time steps may be passed from the encoder to a decoder.

As used herein, "latent space" refers to a bottleneck layer within the encoder-decoder model, wherein a compressed representation of the source sequence data is generated. In embodiments, time steps and hidden states corresponding to those time steps are encoded into the latent space. In one such example, the latent space holds a compressed representation of the sentence encoded in the source sequence data, where that compressed representation is created from each of the time steps and each of the hidden states associated with each time step.

As used herein, a "vector" is an array of numerical values representing the source sequence data, wherein there is a numerical value for each time step. The terms "vector" and "context vector" may be used interchangeably to refer to compressed representation of the sentence encoded in the source sequence data. An "attention context vector" refers an array of numerical values representing the source sequence data, wherein there is a numerical value for each time step, and each numerical values is associated with a weighting value based on attention to particular hidden states at specific time steps.

As used herein, "attention weights" are a weighting value that is attached to each numerical value in the vector representing the time steps and hidden states. In one embodiment, the attention weights are predefined values used to maximize or minimize the score of each hidden state, such that hidden states with relatively high scores are magnified in the machine translation and hidden states with relatively low scores are minimized and "drowned out" during the machine translation. In some embodiments, attention weights are a component used by an attention mechanism in the context of machine translation.

As used herein, "cross entropy loss value" refers to a value calculated by the following formula:

$$L_{ml} = -\sum_{t=1}^{m} \log p(P_t(y_t^s))$$

As used herein, "style transfer strength" refers to a measure or a degree by which the output text belongs to the target or selected style. The style transfer strength may be quantified by the style transfer loss value.

As used herein, "style transfer loss value" refers to a value calculated using one or more of the following formulas. In an embodiment, the style transfer loss function may be expressed using two formulas. The first formula produces a style transfer loss value for embodiments may be defined as, for those situations when source sequence data is being transferred from a first higher level of a particular style into target sequence data having a second relatively low level of the particular style:

$$L_{ts} = -\log(1-s(y'))$$

The second formula produces a style transfer loss value for embodiments when source sequence data is being transferred from a first low level of a particular style into target sequence data having a second relatively higher level of the particular style:

$$L_{ts} = -\log(s(y'))$$

As used herein, "content preservation" refers to a measure or a degree by which the output text retains the core truth or facts of the input text. In simpler terms, content preservation may be considered a measurement of how well the output text has retained the same meaning as the original input text, independent of any style.

As used herein, "content preservation loss value" refers to a value calculated by the following formula:

$$L_{cp} = (r(y') - r(y^s)) \sum_{t=1}^{m} \log p(y_t^s | y_1^s \ldots \ldots y_{t-1}^s, x)$$

As used herein, a "word" refers one or more words. In some embodiments, a word may comprise a single word. In another embodiment, a word may comprise a multi-word phrase (i.e., an n-gram).

Overview

Current encoder-decoder models for performing machine translation are unable to account for stylistic expressions of language when translating text or language from one language to another language. As such, when translating a sentence from one language to another language, current encoder-decoder models are not capable of changing the stylistic expression of the source sequence data into a different stylistic expression for the target sequence data that is output. This is a technological shortcoming or technological problem specific to machine translation. Current encoder-decoder models are limited, at best, to determining the factual meaning of a sentence, for example, without any regard to stylistic expressions.

Embodiments of the current invention provide a technological solution to the technological shortcomings discussed above. In embodiments, a style transfer framework applies integrated loss functions to define and train an encoder-decoder model to account for and change the stylistic expression of text or speech when preforming a machine translation. By defining and training an encoder-decoder model to account for and change the stylistic expression of text or speech when preforming a machine translation, the style transfer framework overcomes the limitations of current machine translation technologies. In this way, the style transfer framework produces an encoder-decoder model having a new technological function, i.e., stylistic expression transfer.

In order to achieve personality or style consistency and conformity across multiple electronic and/or internet-based content, a style transfer framework is described herein that uses an integrated loss function to translate source sequence data exhibiting one expression style into target sequence data having another, different expression style. For example, a sentence having a first "formal personality" style is input and used to generate a new sentence as output, where the new output sentence exhibits the traits of a second "casual personality" style. As such, using the style transfer framework, source sequence data of any style may be modified into a selected style associated with an entity's brand or personality profile. In this way, for example, consistency and conformity with the entity's personality profile is generated across varied content, communications, or presence of an entity, independent of the original source or author of the original content or sequence data. The entity is therefore able to create content and keep that content consistent with the brand across any number of websites, promotions, emails, or the like.

Additionally or alternatively, the source sequence data belonging to or corresponding with a first level of a first style may be used to generate and output sequence data having a second level of the same first style. In one such example, a sentence may be changed from a first level (e.g., a lowest level) of an "excitement" style to a second, higher level (e.g., moderate level) of the excitement style. Accordingly, the style transfer framework may be implemented to modify source sequence data of a selected style into a different level of the selected style associated with the personality profile, thus further providing consistency and conformity with the personality profile across varied content, communications, or presence of an entity, independent of the original source or author of the content or sequence data.

The style transfer framework overcomes the limitations of other technologies by using reinforcement-learning to train (i.e., reward) the attention-based encoder-decoder model for computerized machine translation to produce target sequence data having reduced or low overall values as determined by an integrated "overall" loss function. In embodiments, the integrated loss function corresponds to an overall loss function referred to as "Loss." The overall loss function integrates a loss function for determining loss values for style transfer strength and a loss function for content preservation, in some embodiments. The overall loss function Loss provides the reinforcement learning aspect that trains the attention-based encoder-decoder model to perform a style transfer and improve content preservation during machine translation via the style transfer framework. Accordingly, in some embodiments, the integrated loss function is used to reward the attention-based encoder-decoder model when it outputs target sequence data having reduced or low style transfer loss values and reduced or low content preservation loss values.

In embodiments, source sequence data corresponding to a source corpus is input to an encoder component in a recurrent neural network. The encoder component processes the source sequence data to generate a time step for each word in the sentence encoded in the source sequence data, as well as a hidden state for each word in the sentence encoded in the source sequence data, in embodiments. In an embodiment, the encoder component then processes the time steps and hidden states in sequential order using attention weights in order to generate a compressed representation of the source sequence data. The compressed representation (e.g., a vector) is passed to a decoder component in the recurrent neural network, in embodiments.

For each time step, and using the hidden states for each time step, the decoder component applies the integrated "overall" Loss function to train the encoder-decoder model to select a word, in various embodiments. In some embodiments, the decoder component selects a word from the target corpus having a reduced or minimized overall loss value as determined by the Loss function, at a time step. As the Loss function integrates a loss function for style transfer strength, the selection of a word having a reduced or minimized overall loss value as determined by the Loss function at that time step, relative to the overall loss values determined for other candidate words at that time step, is a selection that include a reduced or minimized style transfer loss value determined by the loss function integrated into the Loss function. As the decoder component determines loss values for each time step, and further based on at least one hidden state of the source sequence data, the decoder component generates target sequence data as output. The target sequence data includes the word(s) selected from the target corpus.

Using this style transfer framework, an entity is able to produce content having a style that is consistent with the entity's personality and/or brand using the style transfer framework to change input text, in any style and by any author, into output text of a particular desired style. The style transfer framework uses reinforcement-learning and an attention-based encoder-decoder model to perform style transfer via machine translation. The style transfer framework discussed herein performs transfers between various text styles and/or levels of text styles, in addition to improving the levels of content preservation during machine translation.

At a practical level, an entity desires to maintain style that is consistent with an entity's personality or brand across multiple and diverse forms of electronic content and/or the entity's electronic presence. For example, Company A desires that all text content used on its website, emails, social media accounts, advertisements, promotions, entity-specific mobile applications, entity-specific push notifications, and the like is consistent in "personality" or style, such that all of the text content is recognizable as associated with or is attributed to Company A. The personality or style may be used to distinguish Company A from Company B, for example. In a further example, Company A may desire that all text content on its website, emails, social media accounts, and the like is consistent with a personality profile of the Company A, where that personality profile comprises one or more styles, such that all of the text content is recognizable as associated with or attributed to Company A.

Example Style Transfer Systems

Beginning with FIG. 1, a schematic depiction is provided illustrating an example system 100 in which some embodiments of the present invention may be employed. It should be understood from this Description that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. Although FIG. 1 shows a networked solution with the style system framework on a computing device or server that is separate from the client device, in various embodiments some or all of the functionality of the style system framework can be provided on the client device.

The system 100 in FIG. 1 includes a neural network host 102 (e.g., one or more servers and/or one or more other computing devices). In some instances, the neural network host 102 may be accessed, directly or indirectly, over a direct connection or an indirect connection, such as network 104 (e.g., a LAN or the Internet). In one example, the neural network host 102 may send and/or receive transmissions to and/or from a client device 106 (e.g., a terminal). It is contemplated, however, that any configuration for accessing and/or managing the neural network host 102 may be employed. For instance, the neural network host 102 may be accessed and/or managed directly or indirectly through one or more network connections. Moreover, a database (not shown), or any other memory device or storage component, may also be included in the system 100 to facilitate storage and/or retrieval of data (e.g., electronic sequence data) by any one of the illustrated components.

The neural network host 102 may include a set of neural networks that is trained, or may be trained, based on embodiments of the present invention discussed herein. The trained set of neural networks may generate target sequence data as further described herein. As noted, in some embodiments, the neural network of the neural network host 102 may comprise a style transfer framework.

Figure 2:
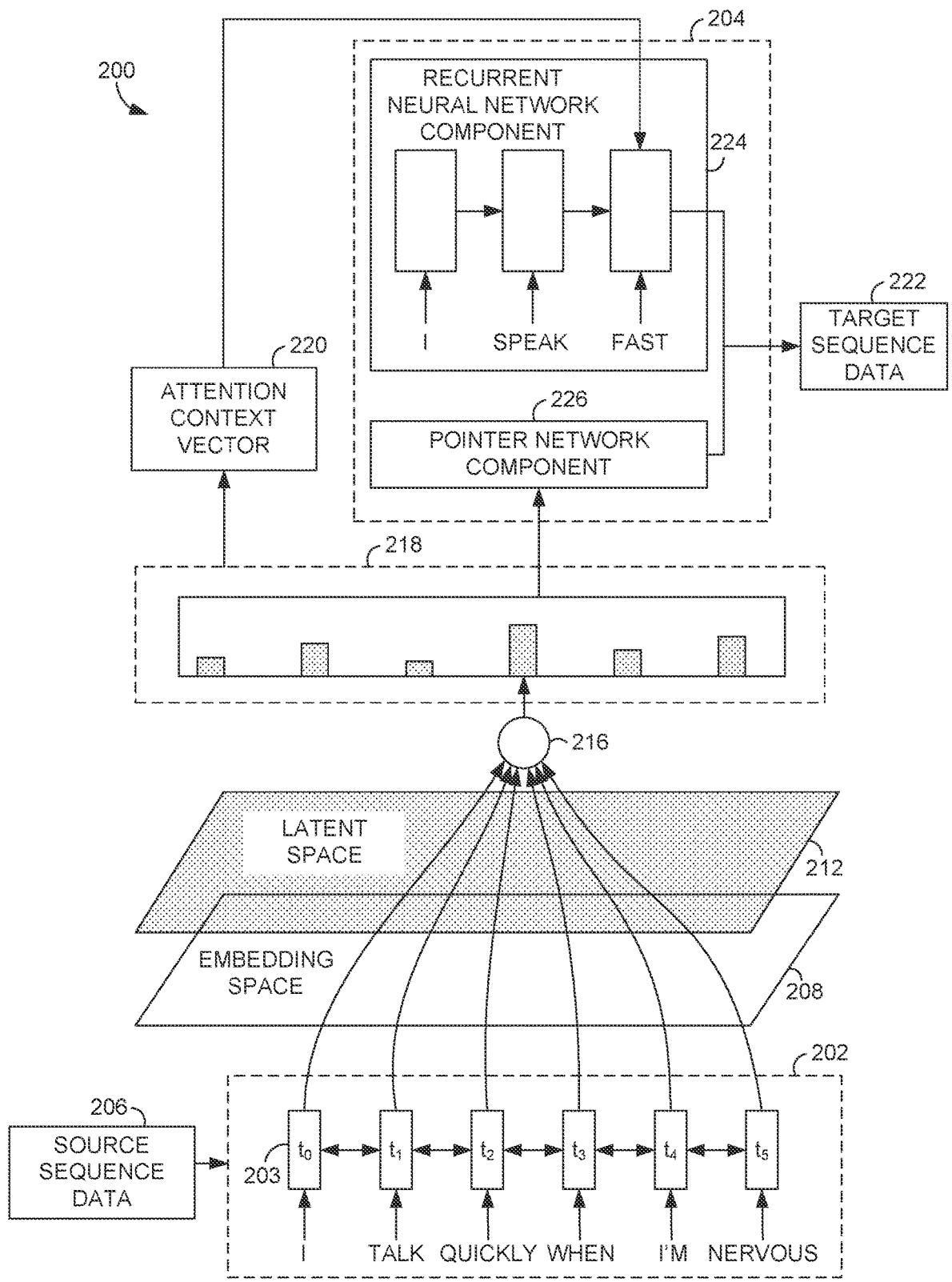
FIG. 2 illustrates a style transfer framework in accordance with an embodiment of the present invention.
Figure 3:
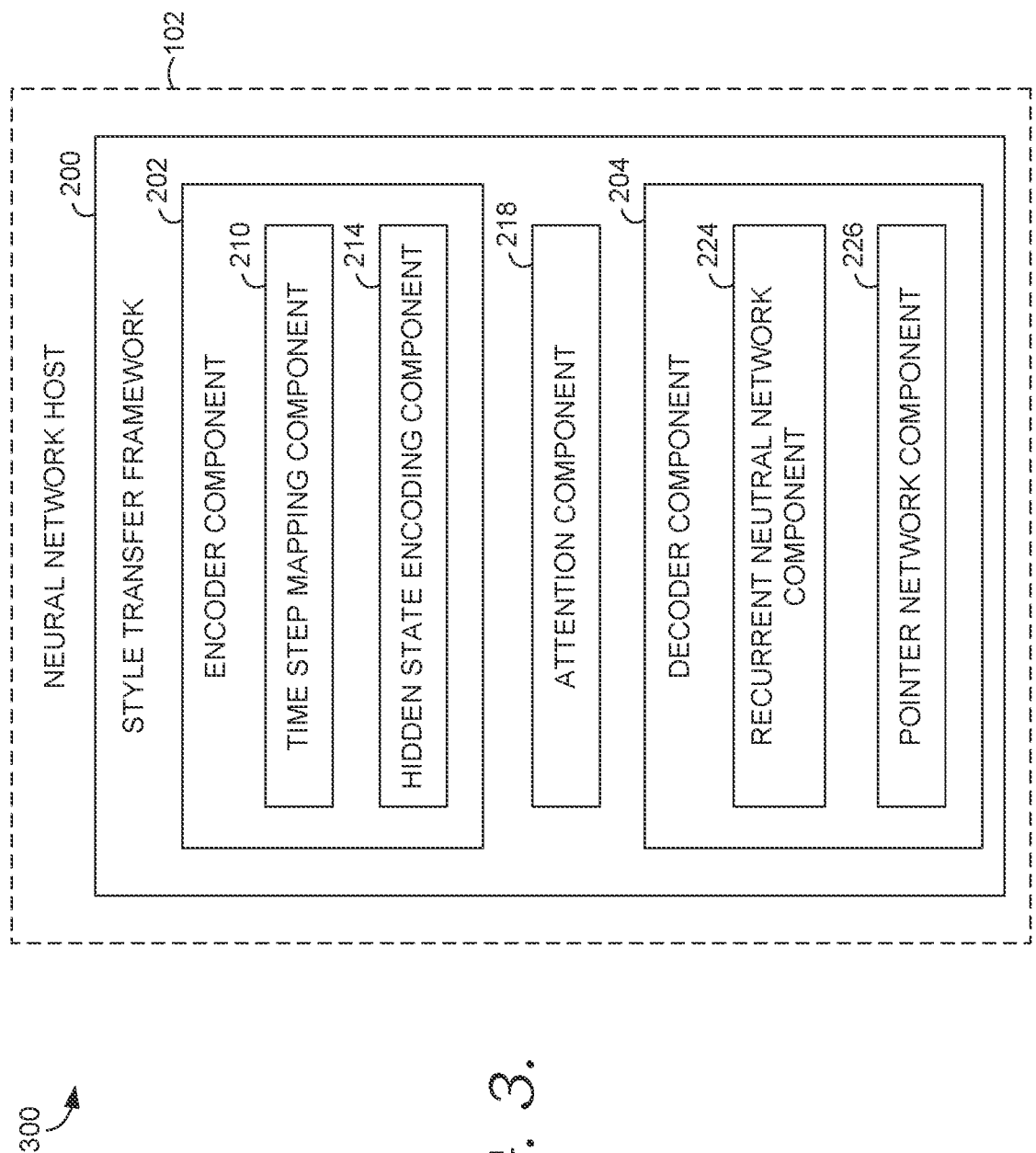
FIG. 3 illustrates a system for the style transfer framework in accordance with an embodiment of the present invention.

Turning to FIG. 2, a style transfer framework 200 is illustrated in accordance with an embodiment of the present invention. Additionally, FIG. 3 illustrates a system 300 comprising the style transfer framework 200, in accordance with an embodiment of the present invention. It is contemplated that any component depicted in FIGS. 2 and 3 is not limited to the illustrated embodiment, however, and may be distributed among a plurality of components or computing devices, or in some instances, may be conflated into a single component or module, such as a processor or other hardware device. It is also contemplated that any one or more of the described components may be completely removed from the style transfer framework 200, so long as one or more operations described corresponding to a removed component may be compensated for by one or more other components, or a third-party resource, remote computing device, or hardware device, among other things.

The style transfer framework 200 comprises an encoder-decoder model, in embodiments. The encoder-decoder model comprises an encoder component 202 and a decoder component 204, in some embodiments. In an embodiment, the encoder-decoder model is a "seq2seq" based model. In some embodiments, the encoder-decoder model is an autoencoder neural network. In one embodiment, the encoder-decoder model comprises a long short-term memory (LSTM) autoencoder, where the LSTM autoencoder is a self-supervised model that operates in order to learn a compressed representation of input data. For example, the LSTM autoencoder may learn the compressed representation for sequence data. Examples of sequence data includes text, video, audio, and time series data. For simplicity, a sentence comprising text is discussed herein as an example of sequence data. As such, "sequence data" and "sentence" may be referred to interchangeably, for the purposes of clarity and ease of explanation in this Detailed Description, though it will be understood that embodiments of the invention are not limited to text or a particular type of sequence data.

Source sequence data 206 that comprises a sentence is received by the style transfer framework 200, in embodiments. In one embodiment, the encoder component 202 of the style transfer framework 200 may receive the source sequence data 206, where that source sequence data 206 encodes a sentence of one or more words belonging to a first corpus of a particular style. For simplicity, this sentence is interchangeably referred to as initial sentence, original sentence, first sentence, and/or source sentence, to indicate that the particular sentence as encoded into the source sequence data 206 serves as input to the style transfer framework 200 or its components, prior to a style transfer. Generally, words in the source sequence data 206 are identified by the style transfer framework 200. In some embodiments, the encoder component 202 may identify each individual word within the source sequence data 206. The encoder component 202 of the encoder-decoder model may map the source sequence data 206 to an embedding space 208, in an embodiment. It will be understood that the embedding space 208 may be a layer within the style transfer framework 200, in some embodiments.

In some embodiments, the encoder component 202 may encode the source sequence data 206 as one or more "time steps," the one or more time steps corresponding to the one or more words of the source sequence data 206. In FIG. 2, each time step is represented as a rectangular box (e.g., time step to 203, shown in an example bidirectional LSTM layer). In a further embodiment, the encoder component 202 comprises a time step mapping component 210, which may map the source sequence data 206 to the embedding space 208 within the encoder-decoder model. For example, the time step mapping component 210 of the encoder component 202 may be configured to, via one or more processors, map each of the identified words in the source sequence data 206 to the embedding space 208. Accordingly, in various embodiments, each of the identified words in the source sequence data 206 is mapped to the embedding space 208 as a corresponding time step via the encoder component 202 and/or the time step mapping component 210 thereof.

Generally, the embedding space 208 is a low-dimensional space into which the source sequence data 206 may be translated into high-dimensional vectors. Within the embedding space 208, sematic relations of the source sequence data 206 and the identified words may be encoded by the encoder component 202 and/or the time step mapping component 210 thereof, in embodiments. When mapping the source sequence data 206 into the embedding space 208, each identified word may be determined to correspond to a separate time step, in some embodiments. The time steps represent the individual identified words, in embodiments. Additionally, the sequence of the time steps represents the sequence of how the words appear relative to one another within the source sequence data 206, in an embodiment. For example, the very first word appearing in the source sequence data 206 may be mapped as time step to (i.e., t=0), while the second word in the source sequence data 206 that immediately follows the first word may be mapped as time step $t_1$ (i.e., t=1), and so on, for any variable number of words that form the source sequence data 206. By mapping the source sequence data 206 to the embedding space, the source sequence data 206 may be represented as a plurality of time steps having a specific sequential order relative to one another, generally. The sequential order of the time steps corresponds to and represents the sequential order of the words as they appeared in the source sequence data 206, in various embodiments. Generally, by encoding each word of the source sequence data 206 into discrete or individual time steps, the encoder component 202 is able to produce a fixed-size representation of the source sequence data 206, in an embodiment. In one embodiment, the fixed-size representation represents the source sequence data 206 as having a specified sequence of words and a length of the source sequence data 206. For example, a source sequence data 206 may be expressed or represented as $X = x_1\ x_2\ x_3\ x_4\ \ldots\ xl$, where l is the length of the source sequence data 206, and $x_n$ refers to the words or time steps identified therein.

Punctuation may also be identified and determined to be an individual time step when the encoder component 202 and/or the time step mapping component 210 thereof maps the source sequence data 206 to the embedding space 208, in some embodiments. In particular, punctuation that relates to stylistic expression may be encoded and considered. For example, punctuation such as an exclamation point ("!") provides stylistic expression information that is useable in the style transfer, discussed herein.

Subsequent to mapping the source sequence data 206 to the embedding space 208 to generate representative time steps, the time steps are encoded into a latent space 212 by the encoder component 202. In some embodiments, the latent space 212 refers to a bottleneck layer within the encoder-decoder model, wherein a compressed representation of the source sequence data 206 is generated. The compressed representation comprises those elements or features of the source sequence data 206 that the encoder component 202 has determined to be the most relevant for carrying to the decoder component 204. The most relevant elements or features may refer to, for example, words corresponding to the sentiment of the source sequence data 206. Accordingly, the words having the highest relevancy to maintaining the content or meaning conveyed by the source sequence data 206 are selected and carried into the compressed representation within the latent space. In some embodiments, the encoder-decoder comprises an autoencoder neural network such that the compressed representation of the source sequence data 206 is a representation that has the fewest number of neurons.

Generally, sequence data determined to have a similar meaning is/are mapped closer to one another within the latent space 212 when generating the compressed representation of the sequence data. As such, in some embodiments, words (i.e., represented as time steps) having similar semantic meanings may be mapped closer to one another in the latent space 212. Additionally, words (i.e., represented as time steps) having different semantic meanings may be mapped apart from one another in the latent space. As used herein, the degree proximity reflects the overlap or lack of overlap between the semantic meanings of the words, and the latent space 212 compressed representation may be visualized as a cluster map, for example. As such, the time steps are encoded to produce an intermediate mapping stage of the sequence data or sentence, referred to as an encoder state or a "hidden" state, in embodiments. In an embodiment, each time step is associated with one or more hidden state(s) for that time step. At a high level, the term "hidden" references a hidden layer of the encoder-decoder model, such as the latent space 212, which is a hidden vector space.

As such, is some embodiments, the time steps are encoded and/or mapped into a latent space 212 by the encoder component 202, which encodes and/or maps one or more of the hidden states for each of the time steps into the latent space 212. In further embodiments, all hidden states for a time step are encoded into the latent space 212 for the time step. In an embodiment, the encoder component 202 comprises a hidden state encoding component 214 for this purpose. In one such embodiment, the hidden state encoding component 214 is configured to, via one or more processors, map time steps into a latent space 212. In further embodiments, the hidden state encoding component 214 is configured to map all hidden states for a time step into the latent space 212 for the time step. For example, element 216 represents a recurrent state of time step $t_3$.

In FIG. 2, the style transfer framework 200 may include an attention component 218. In embodiments, the attention component 218 acts to augment or enhance the performance of the encoder-decoder model. Based on the encoder component 202 encoding the source sequence data 206 into the embedding space 208 as time steps, and further encoding one or more of the hidden states for each of the time steps into the latent space 212, the attention component 218 determines attention weights for each of the one or more hidden states (e.g., each time step representing each word in the source sequence data 206), in some embodiments. The attention weights are used to generate an attention context vector 220, in embodiments. Accordingly, the attention context vector 220 is generated based on the attention component 218 determining content-based attention weights for each hidden state, at each time step, in embodiments. In some embodiments, each hidden state from the encoder component 202 is scored and normalized by the attention component 218 in order to determine a hidden state probability over all the hidden states of the encoder component 202. Using these hidden state probabilities, a weighted sum is determined and used by the attention component 218 to generate the attention context vector 220, in some embodiments. The hidden state of the terminal time step for the source sequence data 206 (e.g., corresponds to the last word in the sentence or the final punctuation of the sentence) may be used, in some embodiments, to initialize the decoder component 204.

In embodiments, the attention context vector 220 is provided to the decoder component 204 of the encoder-decoder model. The decoder component 204 uses the attention context vector 220 in order to generate target sequence data 222 that encodes a target sentence. As used herein, the terms "new sentence," "target sentence," "output sentence," and/or "second sentence" are used interchangeably to refer to the target sequence data that is generated by the decoder component 204 in the transfer of the sequence data. In some embodiments, the decoder component 204 generates target sequence data 222 that encodes a target sentence, such that the target sequence data 222 includes the word(s) selected for each of the one or more time steps based on the decoding. In embodiments, the target sequence data 222 is different from the source sequence data 206, specifically because the target sequence data 222 is the transferred (e.g., transferred from one style corpora to another style corpora) output from the encoder-decoder model, based on the source sequence data 206. In some embodiments, the target sequence data 222 exhibits a different stylistic expression than the source sequence data 206. As further explained herein, the target sequence data 222 produced via the embodiments herein maintains the content of the source sequence data 206, yet exhibits a style transfer relative to the source sequence data 206 having words from the source corpus of one style. The target sequence data 222 has been adjusted or is otherwise different from the stylistic expression of the source sequence data 206 based on the style transfer performed, in embodiments.

In the embodiment of FIGS. 2 and 3, the decoder component 204 comprises a recurrent neural network component 224 ("RNN") which facilitates the style transfer. Alternatively or additionally, the decoder component 204 comprises a convolutional neural network. In performing the style transfer, the decoder component 204 may predict a probability distribution over a vocabulary at each time step, in an embodiment. In one embodiment, the recurrent neural network component 224 of the decoder component 204 may predict a probability distribution over a vocabulary for the attention context vector 220 generated from the source sequence data 206. Generally, the predicted probability distribution may be referred to as "RNN probability distribution" or "vocabulary probability distribution" interchangeably herein. Generally, the vocabulary refers to an entire space of words that the system has access to and "knows," and the system selects a word for a time step from the space of words as discussed further herein.

In embodiments, the decoder component 204 may predict a probability over the words for the attention context vector 220 generated from the source sequence data 206, based on the attention context vector 220. In one embodiment, the decoder component 204 may comprise a pointer network component 226. In such an embodiment, the pointer network component 226 may predict a probability over the words for the source sequence data 206, based on the attention context vector 220. In one such embodiment, the pointer network component 226 may be configured to, via the one or more processors, calculate a words probability distribution for each of the one or more time steps of the attention context vector 220 generated from the source sequence data 206. Generally, the pointer network module predicted probability distribution is referred to as "PTR probability distribution" or "words probability distribution" interchangeably herein.

In further embodiments, the decoder component 204 comprises the recurrent neural network component 224 and the pointer network component 226, as shown in FIGS. 2 and 3. In one such embodiment, the decoder component 204 predicts a vocabulary probability distribution using the recurrent neural network component 224 and predicts a words probability distribution using the pointer network component 226.

Continuing, in order to generate the target sequence data, the decoder component 204 may calculate an overall probability distribution for each time step encoded in the attention context vector 220, in embodiments. As such, the decoder component 204 selects one or more word(s) (i.e., for each time step) by decoding each of the one or more time steps, hidden states, and attention weights, as encoded within the attention context vector 220.

The overall probability distribution may be calculated by the decoder component 204 for each of the individual time steps. For example, the decoder component 204 may determine a weighted average using the vocabulary probability distribution $\delta P_t^{RNN}(w)$ and the words probability distribution $(1-\delta)P_t^{PTR}(w)$ The overall probability distribution $P_t(w)$ at time step t is then calculated using the weighted average of the vocabulary probability distribution and the words probability distribution. In some embodiments, the overall probability distribution may be expressed as:

$$P_t(w) = \delta P_t^{RNN}(w) + (1-\delta) P_t^{PTR}(w)$$

In embodiments, $\delta$ represents a weight factor that is used to linearly combine the vocabulary probability distribution and the words probability distribution at a time step. This weight factor may be predefined. For example, the weight factor may be computed based on outputs from the encoder-decoder model's hidden states at a previous time step.

Using the overall probability distribution calculated at each time step t, the decoder component 204 generates target sequence data 222 by selecting, at each time step, one word having the highest probability relative to a probability of other words at that time step, in some embodiments. The decoder component 204 generates target sequence data 222 where the word(s) selected for each time step is the word having the highest or the greatest overall probability distribution relative to other available or "candidate" words at that same time step, in some embodiments.

In addition to using the overall probability distribution to select words to construct the target sequence data 222, the encoder-decoder model is trained to reduce cross entropy at each time step, in embodiments. In a further embodiment, the encoder-decoder model is trained to minimize cross entropy for each time step. The following equation may be used to train the encoder-decoder model to reduce and/or minimize cross entropy loss values for each time step, in an embodiment:

$$L_{ml} = -\sum_{t=1}^{m} \log p(P_t(y_t^*))$$

In the equation directly above, referred to herein as the "cross entropy" loss function or equation, m represents the maximum length for the target sequence data 222 and $y_t^*$ represents a ground truth word at time step t. In embodiments, the cross entropy loss function $L_{ml}$ operates to train the encoder-decoder to reduce loss and/or minimize loss by incentivizing or providing reinforcement to the encoder-decoder model. As used herein, "ground truth" refers to a fact or concept in the source sequence data 206 that, prior to style transfer, is intended to persist into the target sequence data 222 after style transfer, in the context of machine learning and/or machine translation arts.

Notably, the cross entropy loss function $L_{ml}$ operates to reward (i.e., reinforcement learning) the encoder-decoder model during training when the encoder-decoder model selects one or more words that reduces loss in the cross entropy loss function $L_{ml}$ on a word-by-word basis (e.g., at each time step). Rewarding reductions in loss at the word level improves the performance of the encoder-decoder model itself in the practical application of machine translation of sequence data. Additionally, operating at the word level produces robust reinforcement learning, in contrast to metrics that operate only on a sentence level. As such, the encoder-decoder model utilizes the overall probability distribution and the cross entropy loss function $L_{ml}$ to select words at each time step in order to generate the target sequence data 222 encoding a target sentence having words that conform to the style of the target corpora. In this fashion, a word having both a highest probability and a greatest loss reduction may be selected at each time step, in specific embodiments. In some embodiments, a word having a probability that meets or exceeds a predefined threshold and a loss reduction that meets or exceeds a predefined threshold may be selected by the decoder component 204 at each time step. In another embodiment, a word having a greatest probability and a loss reduction that meets or exceeds a predefined threshold may be selected by the decoder component 204 at each time step. In yet another embodiment, a word having a probability that meets or exceeds a predefined threshold and a greatest loss reduction may be selected by the decoder component 204 at each time step. In various embodiments, the decoder component 204 may select a word at each time step based on a highest probability, a lowest loss, a predefined threshold for probability, a predefined threshold for loss, or a combination thereof to optimize the target sequence data.

In order to further improve the performance of the encoder-decoder model of the style transfer framework 200 itself in the practical application of machine translation of sequence data, an overall loss function Loss is described herein for additional reinforcement training. The overall loss function Loss incorporates the cross entropy loss function $L_{ml}$ discussed directly above along with discriminator-based loss functions that incentivize and reward style transfer strength. Additionally, in some embodiments, the overall loss function Loss incorporates a loss function that incentivizes and rewards content preservation, as will be described. In some embodiments, the overall loss function Loss may be expressed as:

$$Loss = \alpha L_{ml} + \beta L_{cp} + \gamma L_{ts}$$

The overall loss function Loss improves the performance of the encoder-decoder model itself in the practical application of machine translation of sequence data. For example, the overall loss function Loss improves content preservation in the practical application of the model for machine translation of sequence data. Further, the overall loss function Loss introduces a new and unconventional technological function to the encoder-decoder model: stylistic expression transfer, translating a sentence having words from one style corpora into a new sentence having words from a different style corpora, or a different style level. As discussed herein, the decoder component 204 and/or the recurrent neural network component 224 thereof, may be configured to, via the one or more processors, determine an overall loss value for a word at each of the one or more time steps during training, wherein the overall loss value is determined by the overall loss function Loss, which may be expressed as Loss=$\alpha L_{ml}+\beta L_{cp}+\gamma L_{ts}$, in some embodiments.

In various embodiments, $\alpha$, $\beta$, and $\gamma$ are predefined values that can be used to control the performance of the machine translation. For example, by adjusting the values of $\alpha$, $\beta$, and $\gamma$ relative to one another, the overall loss function may be adjusted to more weight the content preservation function (i.e., modified by $\beta$), the transfer strength function (i.e., modified by $\gamma$), and/or the cross entropy function (i.e., modified by $\alpha$) relative to one another. The values for $\alpha$, $\beta$, and $\gamma$ may be predefined and customizable. In one embodiment, a predefined value $\gamma$>a predefined value for $\alpha$, and the predefined value $\gamma$>a predefined value for $\beta$, such that the style transfer loss function $L_{ts}$ is weighted more heavily that the cross entropy loss function $L_{ml}$ and the content preservation loss function $L_{cp}$. In some embodiments, the values for $\alpha$, $\beta$, and $\gamma$ are the same.

Content Preservation

In some embodiments, the overall loss function Loss includes a content preservation loss function $L_{cp}$ that rewards and/or incentivizes increasing the content preservation between the source sequence data 206 and the target sequence data 222 generated through the encoder-decoder model in the style transfer framework, such as the style transfer framework 200 illustrated in FIGS. 2 and 3. Beginning with the content preservation loss function $L_{cp}$, it operates to train the encoder-decoder model to preserve the content of the source sequence data 206 when generating the target sequence data 222. As used herein, "content preservation" refers to a measure or a degree by which the output text retains the original fact (i.e., "core truth") of the input text. In simpler terms, content preservation may be considered a measurement of how well the target sequence data 222 has retained the same or similar factual meaning as the source sequence data 206, independent of any style. In some embodiments, the content preservation loss function $L_{cp}$ may be expressed as:

$$L_{cp} = (r(y') - r(y^s))\sum_{t=1}^{m} \log p(y_t^s | y_1^s \ldots y_{t-1}^s, x)$$

The content preservation loss function $L_{cp}$ shown directly above rewards and/or incentivizes increasing content preservation of the source sequence data 206 that is translated into the target sequence data 222, as generated by the encoder-decoder model. In embodiments, target sequence data for a possible output sentence $y^s$ is obtained by sampling from the probability distribution $p(y_t^s | y_1^s \ldots y_{t-1}^s)$ at each decoding time step. Target sequence data y' for another possible output sentence represents a baseline output that is obtained by maximizing the output probability distribution at each time step, in embodiments. In this example, the output probability distribution is maximized by using a greedy algorithm at each time step. In some embodiments, a greedy algorithm is a paradigm that uses a problem solving heuristic for making a locally optimal choice at each time step with the intent of finding a global optimum. The term r(y) is defined as the reward function for the target sequence data for each of the possible output sentences $y^s$ or y'. According to the loss function $L_{cp}$, the difference term represents a difference calculated between a reward metric (e.g., Bilingual Evaluation Understudy (BLEU) scores) for a sentence sampled using a greedy algorithm, such as output sentence y', and a reward metric for a sentence that is sampled in a multinomial manner, $$\sum_{t=1}^{m} \log p(y_t^s | y_1^s \ldots y_{t-1}^s, x).$$

The output sentence is compared to the ground truth output using the reward metric, the reward metric being produced by the reward function r(y). Additionally, in the loss function $L_{cp}$, the variable m represents the maximum length of the target sequence data 222, in some embodiments. The log term in the loss function $L_{cp}$ represents a log of likelihood of a word to be a good fit for selection at a particular time step, based on the sequence of words that is generated prior to that particular time step, in various embodiments.

In the content preservation loss function $L_{cp}$, the reward function uses the reward metric to incentivize content preservation. Generally, minimizing $L_{cp}$ encourages or reinforces the encoder-decoder model to learn to generate target sequence data 222 that has a higher reward metric (e.g., BLEU score) relative to the reward metric for the output sentence y' that serves as a baseline output. In some embodiments, a BLEU score is used as the reward metric, wherein the BLEU score is a measure of overlap between target sequence data 222 relative to the ground truth. As such, a high BLEU score indicates a high level of overlap in content, which indicates that ground truth is maintained and content is preserved, for example. In embodiments utilizing BLEU scoring, the score is a numerical value or percentage between 0 and 100, wherein the numerical value of 100 indicates complete overlap (i.e., identical, 100% overlap). This value indicates a degree of similarity, or how similar the candidate target sequence data is to a reference text, with values approaching "100" representing increasing similarity of the text and values approaching "0" indicating increasing dissimilarity of the text.

When ground truth is maintained as indicated by similarity and/or overlap between compared texts, there is a high level of content preservation, as opposed to content degradation. In embodiments, the content preservation loss function $L_{cp}$ provides a reward for high BLEU scores. By rewarding and thus reinforcing the encoder-decoder model to produce target sequence data 222 that has high BLEU scores, and because high BLEU scores indicate high content overlap, the content preservation loss function $L_{cp}$ improves content preservation of the encoder-decoder model in the style transfer framework 200.

Therefore, in various embodiments, the decoder component 204 of the encoder-decoder model may select a word for inclusion in the target sequence data 222 based on the content preservation loss value (i.e., calculated using the content preservation loss function $L_{cp}$) calculated for that word being less than a content preservation loss value (i.e., calculated using the content preservation loss function $L_{cp}$) calculated for all of the other available words that could be selected for that particular time step. In another embodiment, the decoder component 204 may select the word based on the content preservation loss value of that word being less than the content preservation loss values determined for a predefined portion of the other available words for the time step. In yet another embodiment, the decoder component 204 may select the word based on the content preservation loss value of that word being less than the content preservation loss values determined for a predefined threshold (e.g., a percentage, a mode, a median) of the other available words for the time step. In this way, the decoder component 204 of the encoder-decoder model, either during training or having been previously trained, selects a word at each time step in a manner that preserves the content of the source sequence data 206 in the target sequence data 222 being assembled or otherwise generated by the decoder component 204, by selecting a word having reduced and/or minimized loss values determined using the content preservation loss function $L_{cp}$.

Stylistic Expression Transfer

Returning to the overall loss function Loss, the overall loss function Loss comprises a style transfer loss function $L_{ts}$ that rewards and/or incentivizes increasing the style transfer strength of the target sequence data 222 that is generated through the encoder-decoder model in the style transfer framework 200, in some embodiments. The overall loss function Loss provides style transfer strength in addition to the improved content preservation discussed above, in some embodiments where the overall loss function Loss includes the content preservation loss function $L_{cp}$ and the style transfer loss function $L_{ts}$.

In embodiments, the encoder-decoder model is trained using the style transfer loss function $L_{ts}$ to generate target sequence data 222 that exhibits a transfer between two different style corpora (e.g., from text having traits of an excitement style corpora to text having traits of a formal style corpora), or between different levels of the same style (e.g., from text having a first level of excitement style corpora to text having a second level of the excitement style corpora, where the second level exhibits text having a stronger excitement trait than the first level). The style transfer loss function $L_{ts}$ incentivizes the encoder-decoder model to produce target sequence data 222 having the dominant trait(s) of the second style corpora, or target level of style corpora, when the encoder-decoder model is selecting words at each time step based on the overall probability distribution $P_t(w)$ for each time step t, in some embodiments. Additionally, the style transfer loss function $L_{ts}$ penalizes the encoder-decoder model when it produces target sequence data 222 that does not exhibit the dominant traits(s) of the second target style corpora, or target level of style corpora, in various embodiments. In this manner, the style transfer loss function $L_{ts}$ creates reinforcement when the encoder-decoder model performs a style transfer, in embodiments.

In order to create the incentivized reinforcement learning aspect of the style transfer framework 200, a discriminator-based loss function is implemented to reward the encoder-decoder model to produce target sequence data 222 having improved or increased style transfer strength, in some embodiments. Specifically, the style transfer loss function $L_{ts}$ may comprise a high-to-low log operation that reward and thus improves style transfer strength, in various embodiments. In one embodiment, the high-to-low log operation of the style transfer loss function $L_{ts}$ is shown in the following example:

$$L_{ts} = -\log(1 - s(y'))$$

In embodiments, the equation directly above is implemented by the style transfer framework 200 to train the encoder-decoder model to transfer source sequence data 206 from a first level of a particular style corpora to target sequence data 222 of a second level of the particular style corpora, wherein the second level corresponds to a lower level, or a style of reduced strength, relative to the first level.

In this example of the high-to-low log operation of the style transfer loss function $L_{ts}$, the variable y' represents the target sequence data 222 generated by the decoder component 204. In the high-to-low log operation of the style transfer loss function $L_{ts}$, the variable s(y') represents a classifier score of y', in embodiments. In accordance with this example using a high-to-low style transfer loss function $L_{ts}$, as the classifier score s(y') decreases, the style transfer loss value decreases. Using the high-to-low style transfer loss function $L_{ts}$, the target sequence data 222 from the decoder component 204 exhibits minimized style transfer loss values when the source sequence data 206 is transferred from, for example, one style level to another, lesser style level.

Additionally or alternatively, the style transfer loss function $L_{ts}$ may comprise a low-to-high log operation that rewards and thus improves style transfer strength, in some embodiments. In an embodiment, the low-to-high style transfer loss function $L_{ts}$ is shown in the following example:

$$L_{ts} = -\log(s(y'))$$

In embodiments, the equation directly above is implemented by the style transfer framework 200 to train the encoder-decoder model when the source sequence data 206 is being transferred from a first level of a particular style corpora to a second level of the particular style corpora, wherein the second level corresponds to a higher level or a style of greater strength relative to the first level.

The style transfer loss function $L_{ts}$, which may comprise the high-to-low log operation and/or the low-to-high log operation, is integrated into the overall loss function Loss that is used to train the encoder-decoder model of the style transfer framework 200, in an embodiment. Reducing style transfer loss $L_{ts}$ is desirable because a lower style transfer loss value indicates that there is an increased or higher probability of transferring the source sequence data 206 from the first style (e.g., source style corpora) to the target sequence data 222 having the second style (e.g., target style corpora), in some embodiments. In this manner, the style transfer loss function $L_{ts}$ operates to reward reduction and/or minimization loss, thus the encoder-decoder model is trained to reduce and/or minimize the style transfer loss value produced by the style transfer loss function $L_{ts}$. Further, the encoder-decoder model produces target sequence data 222 that has improved probabilities of having the dominant trains of the target style corpora or target level of style, in various embodiments. The reinforcement of the style transfer loss function improves the style transfer strength of the style transfer framework 200 itself, generally.

In various embodiments, the decoder component 204 of the encoder-decoder model may select a word for inclusion in the target sequence data 222 based on the style transfer loss value (i.e., calculated using the style transfer loss function $L_{ts}$) calculated for the word being less than a style transfer loss value (i.e., calculated using the style transfer loss function $L_{ts}$) calculated for all of the other words for that particular time step. In another embodiment, the decoder component 204 may select the word based on the style transfer loss value of that word being less than the style transfer loss values determined for a predefined portion of the other words for that same time step. In yet another embodiment, the decoder component 204 may select the word based on the style transfer loss value of that word being less than the style transfer loss values determined for a predefined threshold (e.g., a percentage, a mode, a median) of the other words for that same time step. In this way, the decoder component 204 of the encoder-decoder model, either being trained or having been previously trained, selects a word at each time step in a manner that produces a particular stylistic expression for the target sequence data 222 being assembled or otherwise generated by the decoder component 204, by selecting a word having reduced and/or minimized loss values based on the style transfer loss function $L_{ts}$.

In one example, when the source sequence data 206 is being transferred from a first style level of a style corpora to a second style level (e.g., low excitement) of that style corpora that is less than the first style level (e.g., highest excitement), a word having a calculated style transfer loss value that is less than at least one other available word for the time step is determined by using the style transfer loss function expressed as $L_{ts}=-\log(1-s(y'))$. As such, this log operator defining the style transfer loss function may be used for transferring style "downward" in style level or style corpora. In another example, when the source sequence data 206 is being transferred from a first style level of a style corpora to a second style level (e.g., highest excitement, level 5) that is greater than the first style level (e.g., moderate excitement, level 3) of that style corpora, a word having the style transfer loss value that is less than at least one other available word for the time step is determined by using the style transfer loss function expressed as $L_{ts}=-\log(s(y'))$. In this example, this log operator defining the style transfer loss function may be used for transferring style "upward" in level of a style corpora.

In some embodiments where the loss function $L_{ts}$ is paired with the cross entropy loss function $L_{ml}$, the combination of these loss functions into the overall loss function Loss used to train the encoder-decoder model to reduce and/or minimize loss produces improved content preservation and creates a robust style transfer between style corpora in the target sequence data 222 that is produced.

In evaluating the style transfer strength of the target sequence data 22 produced by the encoder-decoder model, the transfer style strength may be measured as a percentage of sentences (e.g., a percentage accuracy), generated by the decoder component 204, that belong to the target style corpora relative to an average of previously determined classification probabilities for target sequence data 222 that was generated using a pre-trained style classifier (e.g., an average score). The pre-trained style classifier may be a convolutional neural network based classifier, in some embodiments. For example, the pre-trained style classifier may determine and output probabilities that the source sequence data 206 belongs to a particular style corpora. In such an example, these previously determined classification probabilities are used as a proxy to the incentive or reward values in the style transfer framework 200 during training.

However, because probabilities may not be compatible with, or may not be useable as reward values in some methods of training (e.g., Self-Critic Sequence Training), the log functions of the style transfer loss function $L_{ts}$ may be implemented to transform previously determined classification probabilities into compatible reward values, in embodiments. For example, in one embodiment, by appending the log functions of style transfer loss function $L_{ts}$ to the cross entropy loss function $L_{ml}$, the previously determined classification probabilities input to the log functions are transformed into reward values that are useable in frameworks such as Self-Critic Sequence Training that otherwise would not be compatible with probabilities of the style transfer loss function $L_{ts}$. As such, in some embodiments, the style transfer loss function $L_{ts}$ transforms the style transfer strength probabilities into reward values that are compatible with the reward values of the content preservation loss function $L_{cp}$, for example, such as BLEU scores. Also, by directly appending the log functions of the style transfer loss function $L_{ts}$ to the cross entropy loss function $L_{ml}$, embodiments herein are able to evaluate the performance of the encoder-decoder model on a word-by-word basis (e.g., word level of granularity), as opposed to a sentence-level evaluation. Thus, these embodiments provide a direct optimization of the encoder-decoder model at a deeper granularity than found in other machine-learning technologies.

As discussed, by implementing the style transfer loss function $L_{ts}$ to train the encoder-decoder model in the style transfer framework 200, the performance of the encoder-decoder model itself is improved in the practical application of machine translation of sequence data from one corpora to another. Furthermore, by applying or implementing the style transfer loss function $L_{ts}$, the encoder-decoder model gains a new and unconventional function of stylistic expression transfer.

Although specific embodiments of the overall loss function Loss are discussed hereinabove, it is contemplated that various embodiments of the overall loss function Loss are within the scope of this disclosure. In one embodiment, the overall loss function Loss may be alternatively expressed as $\text{Loss}=\alpha L_{ml}+\beta L_{cp}$. In another embodiment, the overall Loss function may be alternatively expressed as $\text{Loss}=\alpha L_{ml}+\gamma L_{ts}$.

Additionally, it is contemplated that the overall loss function Loss may employ any combination of the discussed loss functions, including $\alpha L_{ml}$, $\beta L_{cp}$, and/or $\gamma L_{ts}$. Moreover, it is contemplated that any combination of $\alpha L_{ml}$, $\beta L_{cp}$, and/or $\gamma L_{ts}$ may be used to train and hone the performance of the encoder-decoder model. For example, one or more initial epochs of training of the model may utilize only the cross entropy loss function $\alpha L_{ml}$, while one or more subsequent epochs may utilize the cross entropy loss function $\alpha L_{ml}$ in combination with the content preservation loss function $\beta L_{cp}$ and/or the style transfer loss function $\gamma L_{ts}$. As such, all variants of the overall loss function and all combinations of training using combinations of the loss functions is/are contemplated to be within the scope of this disclosure.

Exemplary Flow Diagrams

Figure 4:
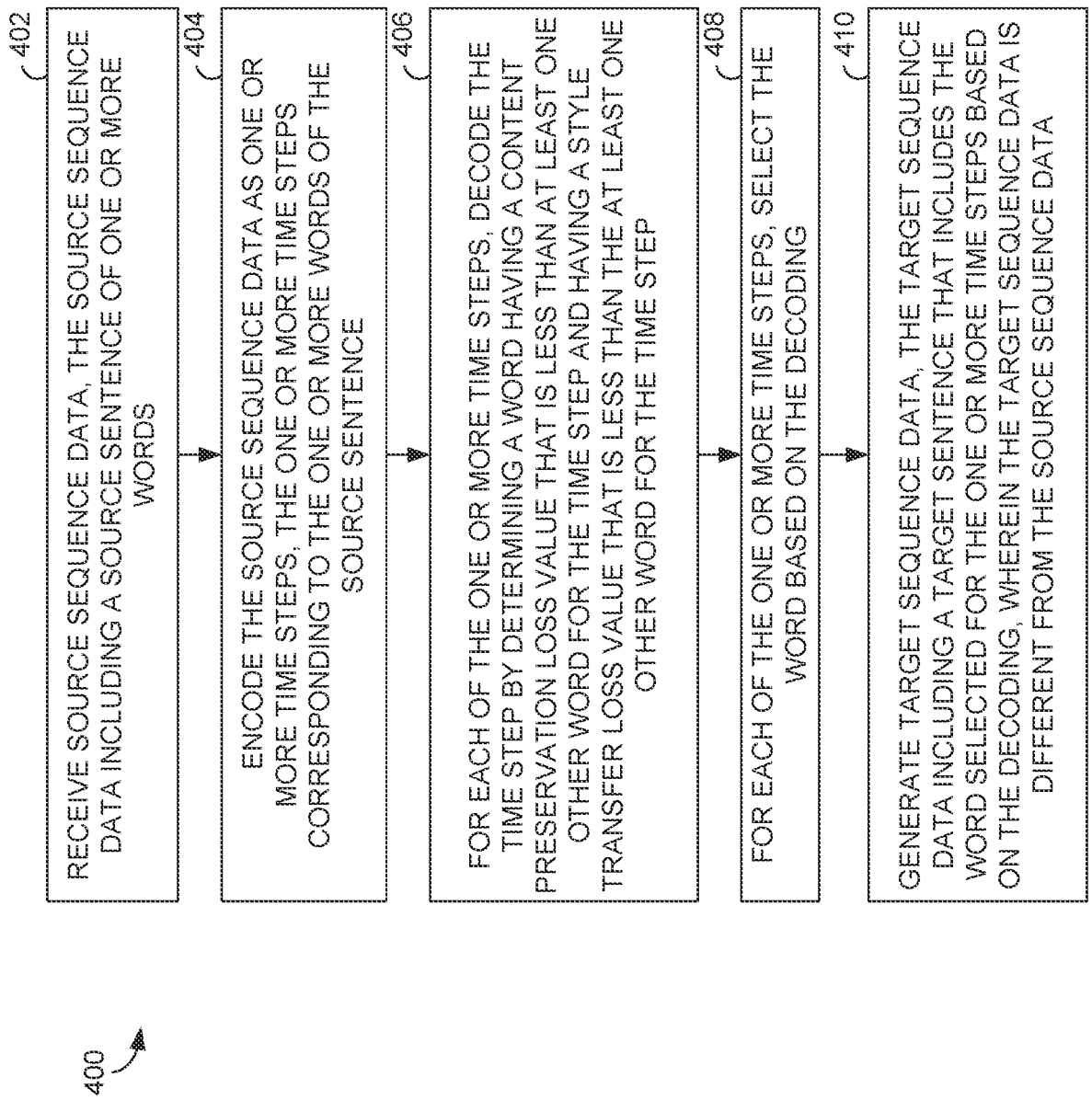
FIG. 4 illustrates a method for style transfer in accordance with an embodiment of the present invention.

Moving on, FIG. 4 illustrates a method 400 for implementing stylistic expression transfer between corpora in accordance with an embodiment of the present invention. In embodiments, the method 400 may be a computer-implemented method that is performed by at least one processor. Accordingly, the method 400 may be performed via a computing device, in embodiments.

The computing device may include an encoder component, such as the encoder component 202 of FIGS. 2 and 3, which may receive source sequence data. As shown in FIG. 4, at block 402, the encoder component may receive source sequence data, the source sequence data including a source sentence of one or more words, in accordance with the method 400.

The computing device may include a time step mapping component, such as the time step mapping component 210 of FIG. 3, which may encode the source sequence data as one or more time steps. At block 404 of the method 400 of FIG. 4, the time step mapping component may encode the source sequence data as one or more time steps, the one or more time steps corresponding to the one or more words of the source sentence. In further embodiments, the computing device may include a hidden state encoding component, such as the hidden state encoding component 214 of FIG. 3. In one embodiment, the hidden state encoding component may map all hidden states for a time step into a latent space.

Additionally or alternatively, the computing device may include an attention component, such as the attention component 218 of FIG. 2, which may determine attention weights for each of the one or more hidden states. In some embodiments, the attention component of the computing device performing the method 400 determines attention weights for each of the one or more hidden states. For example, each of the hidden states for each time step may be weighted using attention weights in order to compute the attention context vector.

Continuing, the computing device may include a decoder component, such as decoder component 204 of FIGS. 2 and 3. At block 406, the decoder component may, for each of the one or more time steps, decode the time step by determining a word having a content preservation loss value that is less than at least one other word for the time step and having a style transfer loss value that is less than the at least one other word for the time step.

In some embodiments, the word having a content preservation loss value that is less than the at least one other word for the time step is calculated using a content preservation loss function. In one embodiment, the content preservation loss function $L_{cp}$ may be expressed as $$L_{cp} = (r(y') - r(y^s)) \sum_{t=1}^{m} \log p(y_t^s | y_1^s \ldots \ldots y_{t-1}^s, x).$$

In some embodiments, the word having the style transfer loss value that is less than the at least one other word for the time step is calculated using a style transfer loss function. In one embodiment, the style transfer loss function may be expressed as $L_{ts} = -\log(1 - s(y'))$. Additionally or alternatively, the word having the style transfer loss value that is less than the at least one other word for the time step is calculated using a style transfer loss function, wherein the style transfer loss function is expressed as, in an embodiment, $L_{ts} = -\log(s(y'))$.

In various embodiments, the decoder component may select the word based on the style transfer loss value being less than a style transfer loss value of all of the other words for the time step. In another embodiment, the decoder component may select the word based on the style transfer loss value being less than the style transfer loss values determined for a predefined portion of the other words for the time step. In yet another embodiment, the decoder component may select the word based on the style transfer loss value being less than the style transfer loss values determined for a predefined threshold (e.g., a percentage, a mode, a median) of the other words for the time step.

In some embodiments, the decoder component may further determine a cross entropy value for a word. For example, a word having the cross entropy loss value that is less than the at least one other word for the time step is calculated using a cross entropy loss function. In one embodiment, the cross entropy loss function may be expressed as $$L_{ml} = -\sum_{t=1}^{m} \log p(P_t(y_t^*)).$$

In some embodiments, decoding the time step comprises applying an overall loss function at the time step. In one embodiment, the overall loss function may be expressed as Loss=$\alpha L_{ml} + \gamma L_{ts}$. In another embodiment, the overall loss function may be expressed as Loss=$\alpha L_{ml} + \beta L_{cp}$. In yet another embodiment, the overall loss function may be expressed as Loss=$\alpha L_{ml} + \beta L_{cp} + \gamma L_{ts}$.

In various embodiments, decoding the time step comprises determining a vocabulary probability distribution. Additionally or alternatively, decoding the time step comprises determining a words probability distribution, in some embodiments. In some embodiments, the decoder component of the computing device comprises one or more of a recurrent neural network component or pointer network component, as described herein. In such embodiments, the decoder component may predict a vocabulary probability distribution using the recurrent neural network component of the computing device performing the method 400. Additionally or alternatively, the decoder component may predict a words probability distribution using the pointer network component of the computing device performing the method 400.

Continuing with the method, at block 408, the decoder component may, for each of the one or more time steps, select the word based on the decoding. In various embodiments, the number of words selected may be more or less than the number of time steps. For example, a phrase or n-gram may be selected for one time step. In some embodiments, the word selected based on the decoding is the word that has a highest overall probability distribution relative to the other words at the time step. At block 410, the decoder component may generate target sequence data, the electronic target sequence data including a target sentence that includes the word selected for the one or more time steps based on the decoding, wherein the target sequence data is different from the source sequence data.

In embodiments, the target sequence data produced by the decoder component (e.g., that encodes a target sentence for output) exhibits the desired stylistic expression transfer, while preserving the content of the source sequence data, based on the decoder component's decoding of each of the time steps, by determining a word having a content preservation loss value that is less than at least one other word for the time step and having a style transfer loss value that is less than at least one other word for the time step. The stylistic expression transfer is achieved by careful word selection based on content preservation loss values and style transfer loss values for each time step. For example, as discussed, the loss function $L_{ts}$ incentivizes the encoder-decoder model to produce sentences with trait(s) of the second "target" style, or target level of style, when the encoder-decoder model is selecting words at each time step t based on the overall probability distribution $P_t(w)$ for each time step t, in some embodiments. Additionally, the loss function $L_{ts}$ penalizes the encoder-decoder model when it produces target sequence data with traits(s) that do not belong to the second target style, or target level of style, in various embodiments. In this manner, the target sequence data produced by the decoder component exhibits the desired stylistic expression transfer, while preserving the content of the source sequence data, based on the decoder component's decoding of each of the time steps, by determining a word having a content preservation loss value that is less than at least one other word for the time step and having a style transfer loss value that is less than at least one other word for the time step.

Figure 5:
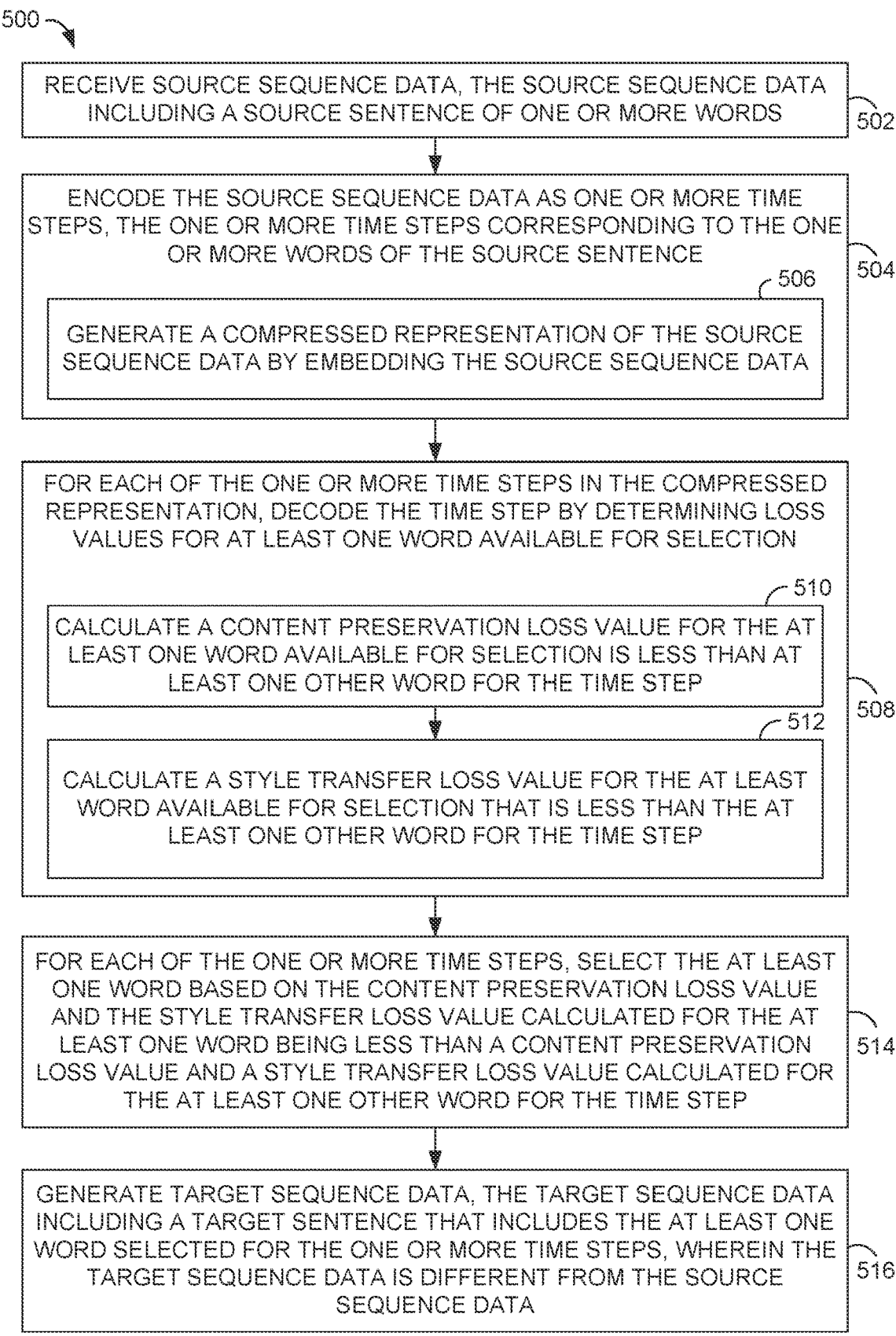
FIG. 5 illustrates another method for style transfer in accordance with an embodiment of the present invention.

Turning now to FIG. 5, a method 500 for implementing stylistic expression transfer in accordance with an embodiment of the present invention is illustrated. In embodiments, the method 500 may be a computer-implemented method, performed by at least one processor. For example, in an embodiment, one or more (e.g., non-transitory storage) computer-readable media having computer instructions stored thereon for execution by one or more processors may be used to perform the method 500, wherein execution of the computer instructions by the one or more processors results in performance of the method 500. Accordingly, the method 500 may be performed via a computing device, in embodiments. The computing device may include one or more of an encoder component having a time step mapping component and/or a hidden state encoding component, a decoder component having a recurrent neural network component and/or a pointer network component, and/or an attention component, for example, such as components of the same name shown in FIGS. 2 and 3.

Beginning at block 502 of the method 500, the encoder component may receive source sequence data, the source sequence data including a source sentence of one or more words, in accordance with the method 500. The encoder component may then encode the electronic source sequence data as one or more time steps, the one or more time steps corresponding to the one or more words of the sentence, as shown as block 504. The encoder component may generate a compressed representation of the sequence source data by embedding the sequence source data, as depicted at block 506.

For each of the one or more time steps in the compressed representation, the decoder component may decode the time step by determining loss values for one or more words available for selection, as shown at block 508. In embodiments, decoding comprises calculating a content preservation loss value for at least one of the one or more words available for selection is less than at least one other word for the time step, at block 510. Decoding may further comprise calculating a style transfer loss value for the at least one of the one or more words available for selection that is less than the at least one other word for the time step, shown at block 512.

As discussed herein, loss function values may be calculated for one or more available words at each time step, and those loss functions drive content preservation and style transfer. In embodiments, the decoder component determines that one word has a lowest content preservation loss value relative to other words for the time step based on a content preservation loss function, as discussed herein. Additionally, in one such embodiment, the decoder component determines whether the one word also has a lowest style transfer loss value relative to the other words for the time step, based on a style transfer loss function, as discussed herein. In a further embodiment, the decoder component may determine whether the one word also has a reduced or lowest cross entropy loss value relative to the other words for the time step, based on a cross entropy loss function, as discussed herein.

At block 514, for each of the one or more time steps, the decoder component may select the at least one word based on the content preservation loss value and the style transfer loss value calculated for the at least one word being is less than a content preservation loss value and a style transfer loss value calculated for at least one other word for the time step. Then, at block 516, the decoder component may generate target sequence data, the target sequence data including a target sentence that includes the at least one word selected for the one or more time steps, wherein the target sequence data is different from the source sequence data. In embodiments, the target sequence data produced via the method 500 exhibits the desired stylistic expression transfer, while preserving the content of the source sequence data, based on the decoder component's decoding of each of the time steps, as discussed with regard to loss function values.

It is contemplated that the systems and methods discussed herein may be used in a variety of implementations, such that the systems and methods are not limited to those practical applications of the technology discussed herein. As such, the systems and methods discussed herein may be deployed in practical applications for machine-translation stylistic expression transfer in mediums other than text. The systems and methods herein may be implemented, for example, and without limitation, with regard to automatic speech recognition or generation, image recognition, visual art processing, natural language processing, customer relationship management, recommendations systems, healthcare, image restoration, bioinformatics, and more.

Exemplary Operating Environment

Figure 6:
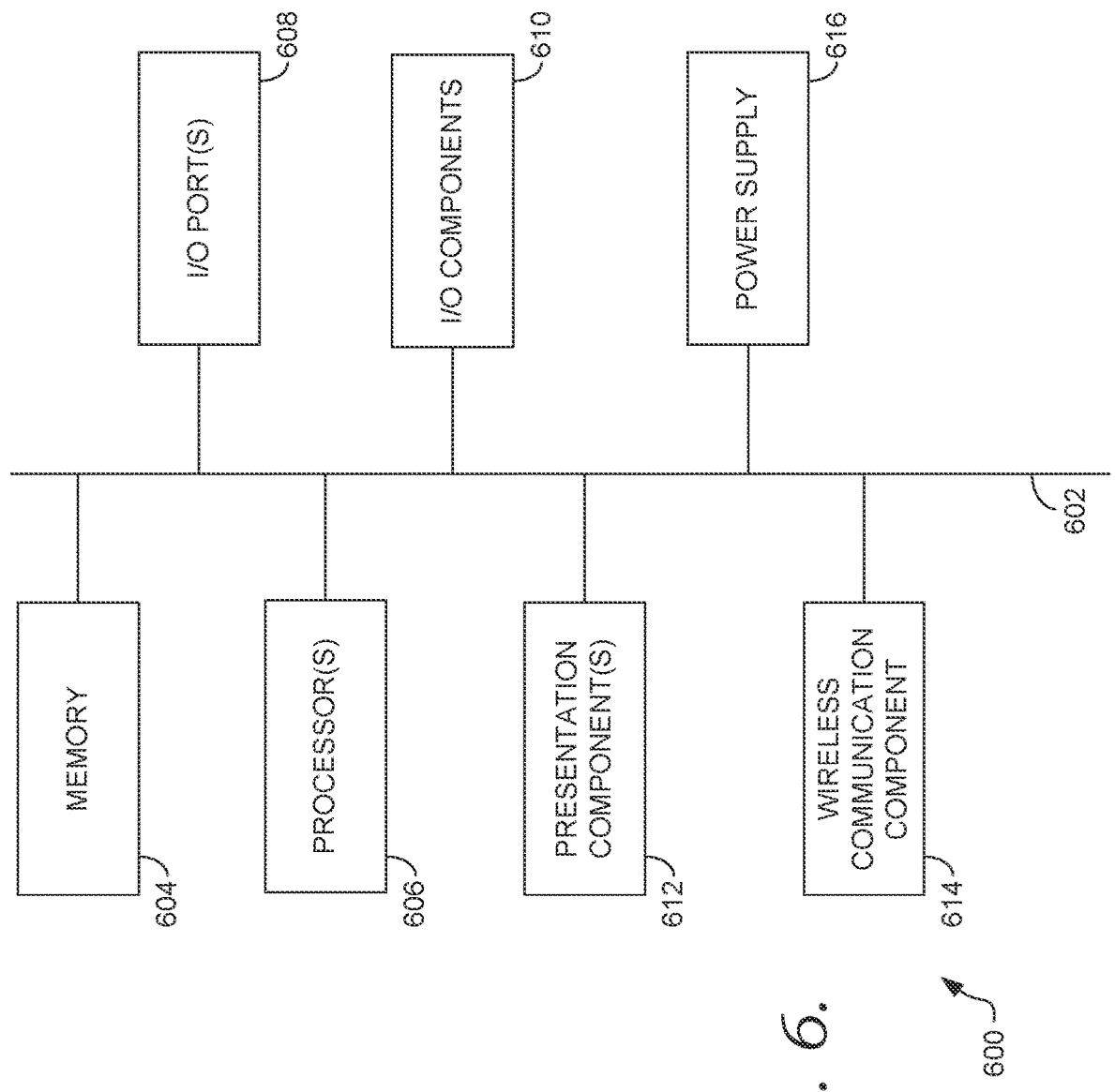
FIG. 6 is a block diagram of an example computing environment suitable for use in implementing some embodiments of the present invention.

Turning to FIG. 6, it depicts a block diagram of a computing device 600 suitable to implement embodiments of the present invention. It will be understood by those of ordinary skill in the art that the computing device 600 is just one non-limiting example of a suitable computing device and is not intended to limit the scope of use or functionality of the present invention. Similarly, the computing device 600 should not be interpreted as imputing any dependency and/or any requirements with regard to each component and combination(s) of components illustrated in FIG. 6. It will be appreciated by those having ordinary skill in the art that the connections illustrated in FIG. 6 may comprise other methods, hardware, software, and/or devices for establishing a communications link between the components, devices, systems, and entities. Although the connections are depicted using one or more solid lines, it will be understood by those having ordinary skill in the art that the connections of FIG. 6 may be hardwired or wireless, and may use intermediary components that have been omitted or not included in FIG. 6 for simplicity's sake. As such, the absence of components from FIG. 6 should be not be interpreted as limiting the present invention to exclude additional components and combination(s) of components. Moreover, though devices and components are represented in FIG. 6 as singular devices and components, it will be appreciated that some embodiments may include a plurality of the devices and components such that FIG. 6 should not be considered as limiting the number of a devices or components.

Continuing, the computing device 600 may be in the form of a server, in some embodiments. Although illustrated as one component in FIG. 6, the present invention may utilize a plurality of local servers and/or remote servers in the computing device 600. The computing device 600 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The computing device 600 may include or may have access to one or more computer-readable media. Computer-readable media may be any available media that may be accessed by the computing device 600. Computer-readable media may include one or more of volatile media, nonvolatile media, removable media, or non-removable media. By way of a non-limiting example, computer-readable media may include computer storage media and/or communication media. Non-limiting examples of computer storage media may include one or more of volatile media, nonvolatile media, removable media, or non-removable media, and may be implemented in any method and/or any technology for storage of information, such as computer-readable instructions, data structures, program modules, or other data. In this regard, non-limiting examples of computer storage media may include Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which may be used to store information and which may be accessed by the computing device 600. Generally, the computer storage media is non-transitory such that it does not comprise a signal per se.

Communication media may embody computer-readable instructions, data structures, program modules, and/or other data in a modulated data signal, such as a carrier wave or other transport mechanism. Communication media may include any information delivery media. As used herein, the term "modulated data signal" refers to a signal that has one or more of its attributes set or changed in such a manner as to encode information in the signal. Non-limiting examples of communication media may include wired media, such as a wired network connection, a direct-wired connection, and/or a wireless media, such as acoustic, radio frequency (RF), infrared, and other wireless media. Combinations of any of the above also may be included within the scope of computer-readable media.

Continuing with FIG. 6, a block diagram of a computing device 600 suitable for providing packing instructions is provided, in accordance with an embodiment of the technology. It should be noted that although some components depicted in FIG. 6 are shown in the singular, they may be plural, and the components may be connected in a different, including distributed, configuration. For example, computing device 600 may include multiple processors and/or multiple radios. As shown in FIG. 6, computing device 600 includes a bus 602 that may directly or indirectly connect different components together, including memory 604 and a processor 606. In further embodiments, the computing device 600 may include one or more of an input/output (I/O) port 608, I/O component 610, presentation component 612, or wireless communication component 614, such as a radio transceiver. The computing device 600 may be coupled to a power supply 616, in some embodiments.

Memory 604 may take the form of the memory components described herein. Thus, further elaboration will not be provided here, but it should be noted that memory 604 may include any type of tangible medium that is capable of storing information, such as a database. A database may include any collection of records, data, and/or other information. In one embodiment, memory 604 may include a set of computer-executable instructions that, when executed, facilitate various functions or steps disclosed herein. These instructions will variously be referred to as "instructions" or an "application" for short. Processor 606 may actually be multiple processors that may receive instructions and process them accordingly. Presentation component 612 may include a display, a speaker, a screen, a portable digital device, and/or other components that may present information through visual (e.g., a display, a screen, a lamp, a light-emitting diode (LED), a graphical user interface (GUI), and/or even a lighted keyboard), auditory (e.g., a speaker), haptic feedback, and/or other tactile cues. Wireless communication component 614 may facilitate communication with a network as previously described herein. Additionally or alternatively, the wireless communication component 614 may facilitate other types of wireless communications, such as Wi-Fi, WiMAX, LTE, Bluetooth, and/or other VoIP communications. In various embodiments, the wireless communication component 614 may be configured to concurrently support multiple technologies.

I/O port 608 may take a variety of forms. Example I/O ports may include a USB jack, a stereo jack, an infrared port, a firewire port, and/or other proprietary communications ports. I/O component 610 may comprise one or more keyboards, microphones, speakers, touchscreens, and/or any other item useable to directly or indirectly input data into the computing device 600. Power supply 616 may include batteries, fuel cells, and/or any other component that may act as a power source to supply power to computing device 600 or to other components.

Although internal components of the computing device 600 are not illustrated for simplicity, those of ordinary skill in the art will appreciate that internal components and their interconnection are present in the computing device 600 of FIG. 6. Accordingly, additional details concerning the internal construction of the computing device 600 are not further disclosed herein. Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a descriptive sense only and not for purposes of limitation, unless described otherwise.

What is claimed is:

1. One or more computer-readable media having computer instructions stored thereon for execution by one or more processors, wherein execution of the computer instructions by the one or more processors provides a method for stylistic expression transfer, the media comprising:
   obtaining, by an encoder component, source sequence data including one or more words;
   encoding, by the encoder component, the source sequence data as one or more time steps;
   applying an overall loss function at each of the one or more time steps to train an encoder-decoder model, wherein the overall loss function comprises a first weight applied to a cross entropy function, a second weight applied to a content function, and a third weight applied to a style transfer function;
   selecting, by a decoder component, at least one word of the one or more words for the one or more time steps, wherein the one word is selected based on a content value and a style value of the one word; and
   generating, by the decoder component, target sequence data that includes the at least one word that is selected, wherein the target sequence data is different from the source sequence data.

2. The media of claim 1, further comprising determining the content value for each of the one or more time steps.

3. The media of claim 1, further comprising determining the style value for each of the one or more time steps.

4. The media of claim 1, further comprising determining a vocabulary probability distribution for the one or more time steps.

5. The media of claim 4, wherein the at least one word is selected further based on the probability distribution relative to another of the one or more words for the one or more time steps.

6. The media of claim 1, further comprising determining a cross entropy value for the at least one word, wherein the cross entropy value is calculated using a cross entropy function.

7. The media of claim 1, wherein the style value of the at least one word that is selected is less than at least one other word for the one or more time steps.

8. The media of claim 1, wherein the content value of the at least one word that is selected is less than at least one other word for the one or more time steps.

9. A method for implementing stylistic expression transfer, the method comprising:
   obtaining, by an encoder component, source sequence data including one or more words;
   encoding, by the encoder component, the source sequence data as one or more time steps;
   determining an overall loss value for the one or more words for the one or more time steps, wherein the overall loss value comprises a first weight applied to a cross entropy function, a second weight applied to a content function, and a third weight applied to a style function;
   selecting, by a decoder component, at least one word of the one or more words for each of the one or more time steps, wherein the at least one word is selected for the time step based on a content value and a style value of the at least one word; and
   generating, by the decoder component, target sequence data that includes the at least one word that is selected, wherein the target sequence data is different from the source sequence data.

10. The method of claim 9, further comprising calculating a probability distribution for the one or more words of the one or more time steps.

11. The method of claim 9, further comprising mapping each of the one or more words of the source sequence data to an embedding space.

12. The method of claim 9, further comprising mapping one or more hidden states for the one or more time steps into a latent space.

13. The method of claim 12, further comprising determining attention weights for each of the one or more hidden states.

14. The method of claim 9, wherein when the source sequence data is being transferred from a first style level to a second style level that is less than the first style level, the at least one word having the style value that is less than at least one other word for the time step is calculated using a style transfer function.

15. The method of claim 9, wherein when the source sequence data is being transferred from a first style level to a second style level that is greater than the first style level, the at least one word having the style value that is less than at least one other word for the time step is calculated using a style transfer function.

16. A computer system comprising:
   one or more processors; and
   one or more computer-readable media having computer instructions stored thereon for execution by the one or more processors, wherein execution of the computer instructions by the one or more processors cause operations comprising:
   obtaining, by an encoder component, source sequence data including one or more words;
   encoding, by the encoder component, the source sequence data as one or more time steps;
   determining an overall loss value for the one or more words for the one or more time steps, wherein the overall loss value comprises a first weight applied to a cross entropy function, a second weight applied to a content function, and a third weight applied to a style function;
   selecting, by a decoder component, a word of the one or more words for each of the one or more time steps, wherein the word is selected for the time step based on a content value and a style value of the word; and
   generating, by the decoder component, target sequence data that includes the word that is selected, wherein the target sequence data is different from the source sequence data.

* * * * *